(12) United States Patent
Huang

(10) Patent No.: US 8,093,850 B2
(45) Date of Patent: Jan. 10, 2012

(54) FAN CONTROL SYSTEM

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 337 days.

(21) Appl. No.: 12/580,264

(22) Filed: Oct. 16, 2009

(65) Prior Publication Data

US 2011/0068726 A1 Mar. 24, 2011

(30) Foreign Application Priority Data

Sep. 18, 2009 (CN) .......................... 2009 1 0307303

(51) Int. Cl.
*G05D 23/20* (2006.01)

(52) U.S. Cl. .................. 318/471; 318/472; 318/400.08; 318/400.3; 318/788; 417/32

(58) Field of Classification Search .................. 318/471, 318/472, 400.08, 400.3, 788; 417/32
See application file for complete search history.

(56) References Cited

U.S. PATENT DOCUMENTS

| 5,757,172 A * | 5/1998 | Hunsdorf et al. .............. 323/277 |
| 6,205,010 B1 * | 3/2001 | Ohsaka et al. ................. 361/103 |
| 6,856,139 B2 * | 2/2005 | Rijken et al. ................... 324/537 |
| 2002/0187049 A1 * | 12/2002 | Lee .................................. 417/32 |
| 2003/0218465 A1 * | 11/2003 | Rijken et al. ................... 324/537 |
| 2006/0109627 A1 * | 5/2006 | Lee ................................ 361/695 |

\* cited by examiner

*Primary Examiner* — Paul Ip
(74) *Attorney, Agent, or Firm* — Altis Law Group, Inc.

(57) ABSTRACT

A fan control system includes a linear adjustor, an input/output controller, and a temperature sensor. A first terminal of the linear adjustor is connected to a first power supply. A second terminal of the linear adjustor is connected to a fan and grounded via a first resistor and a second resistor in series. A third terminal of the linear adjustor is connected to a node between the first resistor and the second resistor. A first terminal of the input/output controller is connected to the third terminal of the linear adjustor via a third resistor. A second terminal of the input/output controller is connected to the temperature sensor.

3 Claims, 2 Drawing Sheets

FAN CONTROL SYSTEM

BACKGROUND

1. Technical Field

The present disclosure relates to a fan control system.

2. Description of Related Art

A conventional cooling fan for an electronic device often rotates at a fixed speed, with no way for the fan to increase the speed of the fan when the temperature goes higher. Nor can the fan slow down to conserve power when the temperature decreases.

DETAILED DESCRIPTION

Figure 1:
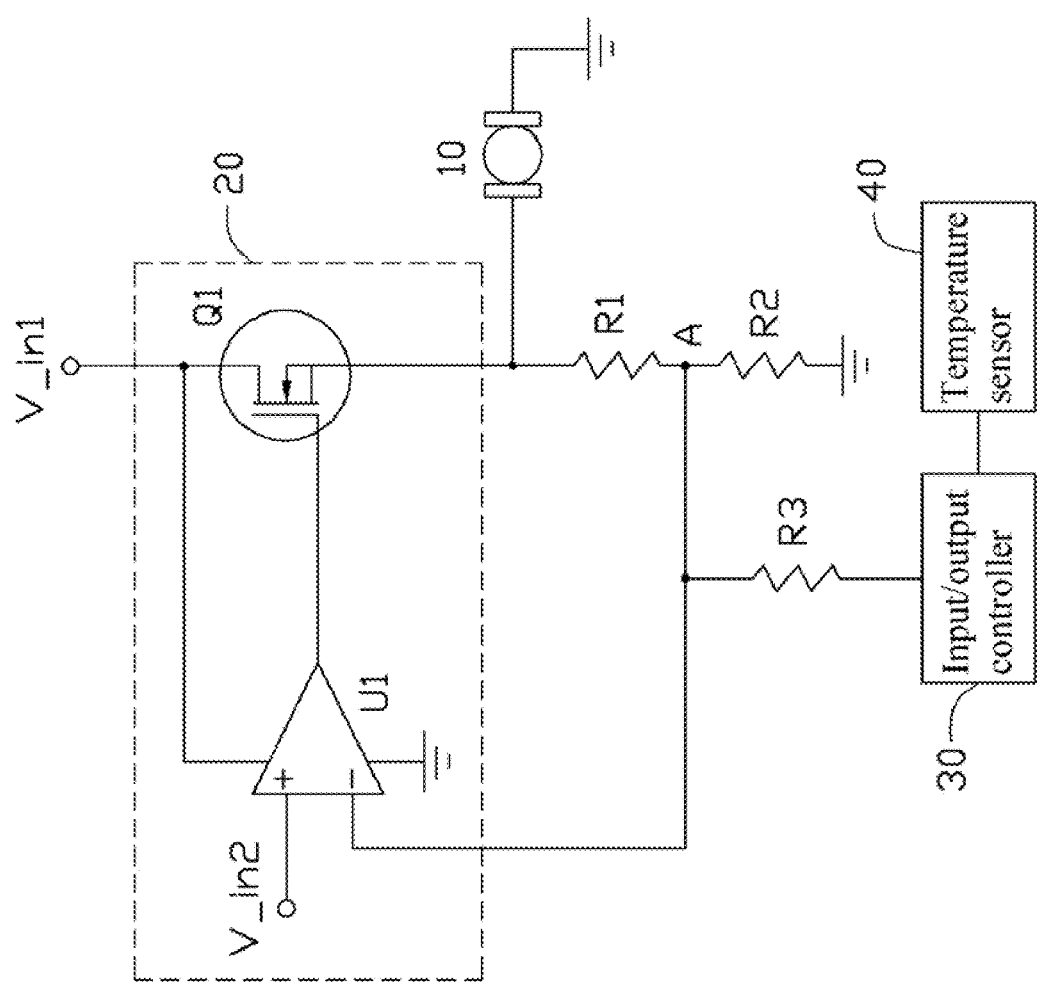
FIG. 1 is a circuit diagram of a first exemplary embodiment of a fan control system.

Referring to FIG. 1, a first exemplary embodiment of a fan control system includes a linear adjustor 20, an input/output controller 30, and a temperature sensor 40.

The linear adjustor 20 includes a first terminal, a second terminal, and a third terminal. The first terminal of the linear adjustor 20 is connected to a first power supply V_in1. The second terminal of the linear adjustor 20 is connected to a fan 10 and grounded via a first resistor R1 and a second resistor R2 in series. The third terminal of the linear adjustor 20 is connected to a node A between the first resistor R1 and the second resistor R2. A first terminal of the input/output controller 30 is connected to the third terminal of the linear adjustor 20 via a third resistor R3. A second terminal of the input/output controller 30 is connected to the temperature sensor 40. The second terminal of the linear adjustor 20 outputs a load voltage V-out.

The linear adjustor 20 also includes a metal-oxide-semiconductor field effect transistor (MOS-FET) Q1, an operational amplifier U1, and a second power supply V_in2.

A drain of the MOS-FET Q1 functions as the first terminal of the linear adjustor 20. A source of the MOS-FET Q1 functions as the second terminal of the linear adjustor 20. An output of the operational amplifier U1 is connected to a gate of the MOS-FET Q1. A non-inverting input of the operational amplifier U1 is connected to the second power supply V_in2. An inverting input of the operational amplifier U1 functions as the third terminal of the linear adjustor 20. A power terminal of the operational amplifier U1 is connected to the first power supply V_in1. A ground terminal of the operational amplifier U1 is grounded.

The linear adjustor 20 stabilizes a voltage of the node A between the first resistor R1 and the second resistor R2 at a stable voltage V-ref.

The temperature sensor 40 detects temperature in the electronic device and outputs a first signal. The input/output controller 30 receives the first signal and outputs a pulse width modulation (PWM) signal accordingly. A duty cycle of the PWM signal varies according to the first signal. For example, the duty cycle of the PWM signal increases when the temperature in the electronic device falls, and the radio of the PWM signal decreases when the temperature in the electronic device rises.

An equivalent resistor Ra is equivalent to the second resistor R2 and third resistor R3. A resistance of the equivalent resistor Ra varies according to the PWM signal. The equivalent resistor Ra is connected in series with the first resistor R1. The relationship of the load voltage V-out, stable voltage V-ref, resistances of the first resistor R1 and the equivalent resistor Ra is:

$$V\text{-out}=V\text{-ref}*(1+R1/Ra)$$

The load voltage V-out has a lower limit when the equivalent resistor Ra reaches a maximum value. The load voltage V-out has an upper limit when the equivalent resistor Ra reaches a minimum value.

The second resistor R2 is connected in parallel with the third resistor R3 when the duty cycle of the PWM signal is 0%. The minimum value of the equivalent resistor Ra is:

$$Ra=R2*R3/(R2+R3)$$

When the duty cycle of the PWM signal is 0%, the upper limit of the load voltage V-out is:

$$V\text{-out}=V\text{-ref}*[1+R1(R2+R3)/(R2R3)]$$

The equivalent resistor Ra is equivalent to the second resistor R2 when the duty cycle of the PWM signal is 100%. The lower limit of the load voltage V-out is:

$$V\text{-out}=V\text{-ref}*[1+R1/R2]$$

The load voltage V-out is between the lower limit V-ref*[1+R1/R2] and the upper limit V-ref*[1+R1(R2+R3)/(R2R3)] when the duty cycle of the PWM signal is between 0% and 100%.

Figure 2:
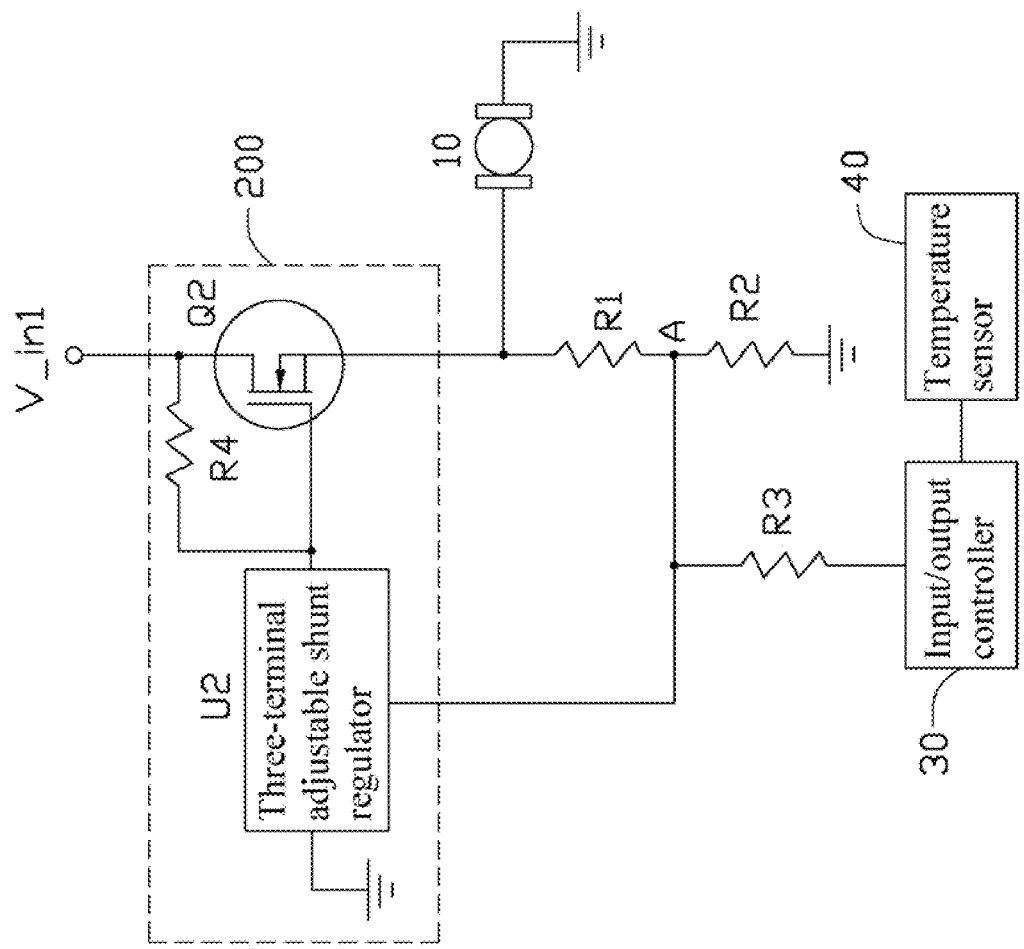
FIG. 2 is a circuit diagram of a second exemplary embodiment of a fan control system.

Referring to FIG. 2, a second exemplary embodiment differs from the first exemplary embodiment only in a linear adjustor 200 as opposed to the linear adjustor 20 of the first exemplary embodiment.

The linear adjustor 200 includes a metal-oxide-semiconductor field effect transistor (MOS-FET) Q2, an three-terminal adjustable shunt regulator U2, and a fourth resistor R4. A drain of the MOS-FET Q2 functions as the first terminal of the linear adjustor 200 and is connected to the first power supply V_in1. A source of the MOS-FET Q2 functions as the second terminal of the linear adjustor 200, and is connected to the fan 10 and grounded via the first resistor R1 and the second resistor R2 in series. A gate of the MOS-FET Q2 is connected to the first power supply V_in1 via the fourth resistor R4. A cathode of the three-terminal adjustable shunt regulator U2 is connected to the gate of the MOS-FET Q2. An anode of the three-terminal adjustable shunt regulator U2 is grounded. A reference input of the three-terminal adjustable shunt regulator U2 functions as the third terminal of the linear adjustor 200, and is connected to the node A between the first resistor R1 and the second resistor R2.

The foregoing description of the exemplary embodiments of the disclosure has been presented only for the purposes of illustration and description and is not intended to be exhaustive or to limit the disclosure to the precise forms disclosed. Many modifications and variations are possible in light of the above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A fan control system for a fan, comprising:
a linear adjustor comprising a first terminal connected to a first power supply, a second terminal connected to the fan and grounded via a first resistor and a second resistor in series, and a third terminal connected to a node between the first resistor and the second resistor;
an input/output controller comprising a first terminal connected to the third terminal of the linear adjustor via a third resistor, and a second terminal; and
a temperature sensor connected to the second terminal of the input/output controller.

2. The fan control system of claim 1, wherein the linear adjustor comprises a metal-oxide-semiconductor field effect transistor (MOS-FET), and an operational amplifier, wherein a drain of the MOS-FET functions as the first terminal of the linear adjustor, a source of the MOS-FET functions as the second terminal of the linear adjustor, an output of the operational amplifier is connected to a gate of the MOS-FET, a non-inverting input of the operational amplifier is connected to a second power supply, an inverting input of the operational amplifier functions as the third terminal of the linear adjustor, a power terminal of the operational amplifier is connected to the first power supply, and a ground terminal of the operational amplifier is grounded.

3. The fan control system of claim 1, wherein the linear adjustor comprises a metal-oxide-semiconductor field effect transistor (MOS-FET), a three-terminal adjustable shunt regulator, and a fourth resistor, wherein a drain of the MOS-FET functions as the first terminal of the linear adjustor, a source of the MOS-FET functions as the second terminal of the linear adjustor, a gate of the MOS-FET is connected to the first power supply via the fourth resistor, a cathode of the three-terminal adjustable shunt regulator is connected to the gate of the MOS-FET, an anode of the three-terminal adjustable shunt regulator is grounded, and a reference input of the three-terminal adjustable shunt regulator functions as the third terminal of the linear adjustor.

* * * * *